United States Patent
Redelberger

[11] Patent Number: 6,043,616
[45] Date of Patent: Mar. 28, 2000

[54] ELECTROMOTIVE ACTUATOR FOR A CLOSING PART, IN PARTICULAR FOR A WINDOW OR A SLIDING ROOF IN A MOTOR VEHICLE

[75] Inventor: Harald Redelberger, Kuernach, Germany

[73] Assignee: Siemens Aktiengesellschaft, Munich, Germany

[21] Appl. No.: 09/049,080

[22] Filed: Mar. 27, 1998

[30] Foreign Application Priority Data

Sep. 28, 1995 [DE] Germany ............ 295 15 515 U

[51] Int. Cl.$^7$ .................... H02K 7/10; G05B 5/00
[52] U.S. Cl. .................... 318/9; 314/14; 314/468
[58] Field of Search ............ 318/280 M, 445, 318/452–455, 456–458, 461, 466–469, 560, 561, 3, 9–15

[56] References Cited

U.S. PATENT DOCUMENTS

| | | | |
|---|---|---|---|
| 3,818,300 | 6/1974 | Stroman | 318/561 |
| 4,847,541 | 7/1989 | Krieger | 318/468 |
| 5,249,118 | 9/1993 | Smith | 364/167.01 |
| 5,363,246 | 11/1994 | Perry et al. | 359/874 |
| 5,404,673 | 4/1995 | Takeda et al. | 49/28 |
| 5,438,247 | 8/1995 | Kim et al. | 318/696 |
| 5,653,144 | 8/1997 | Fenelon | 74/411 |
| 5,729,101 | 3/1998 | Richmond et al. | 318/282 |
| 5,869,940 | 2/1999 | Parsadayan | 318/461 |

FOREIGN PATENT DOCUMENTS

| | | |
|---|---|---|
| 0261525 | 3/1988 | European Pat. Off. . |
| 3736218 | 5/1988 | Germany . |
| 9217563 U | 5/1993 | Germany . |
| 9313015 U | 12/1993 | Germany . |
| 4432955 | 3/1995 | Germany . |
| 19536207 | 4/1996 | Germany . |

*Primary Examiner*—Brian Sircus
*Attorney, Agent, or Firm*—Sughrue, Mion, Zinn, Macpeak & Seas, PLLC

[57] ABSTRACT

A geared motor actuator having a simplified mechanical structure for driving a closing part, such as a vehicle window, moved as far as at least one end position by an electric motor (MO) via a gear (G), preferably a worm gear. Shortly before the end position is reached, switch-off of the electric motor (MO) is performed in accordance with a control device (ST). The gear (G) is drive-connected to an output driver of the closing part without any damping means. The worm wheel (4) of the worm gear, being a solid, integral component that is preferably injection-molded from plastic, is preferably designed to include the output driver as part of the integral component, and provided with a drive pinion (4.1).

18 Claims, 4 Drawing Sheets

ELECTROMOTIVE ACTUATOR FOR A CLOSING PART, IN PARTICULAR FOR A WINDOW OR A SLIDING ROOF IN A MOTOR VEHICLE

This is a Continuation of International Application PCT/DE96/01705, with an international filing date of Sep. 11, 1996 the disclosure of which is incorporated into this application by reference.

FIELD OF AND BACKGROUND OF THE INVENTION

The invention relates to new and useful improvements in electromotive actuators. More particularly, the invention relates to an electromotive actuator for a part which opens and closes (hereinafter termed a closing part), such as a window or a sliding roof in a motor vehicle.

German Utility Model 92 17 563 discloses an electromotive actuator for a closing part, for example for a motor vehicle window or a motor vehicle sliding roof, in which the position of the closing part is recorded electromotively and stored. When a specific distance from one end position of the closing part is reached, the motor power is reduced, whereby the speed of movement is reduced to a minimum value. This ensures a smooth and reliable run into the end position. Moreover, for protection against jamming, the power consumption of the electric motor is monitored against a previously stored power consumption.

European Patent 0,261,525 discloses a geared motor actuator for a motor vehicle window drive having a worm gear. The worm shaft is provided on an extended motor shaft end and drives a worm wheel. The worm wheel is axially plug-connected to an output driver plate by means of a fitting engagement. This driver plate drives the remaining window lifting mechanism. The worm gear arrangement uses the electric motor to drive the window pane with full torque into its end position, i.e., either the "window closed" or "window opened" position, until a limit stop is reached.

In order to dampen the impact stresses which otherwise would act on the motor and the other parts of the gear assembly, an elastic damping element is provided between the worm wheel and the driver plate mounted axially in front of the worm wheel. The worm wheel is driven by the motor shaft via the worm shaft and the driver plate is driven positively by means of the aforementioned plug connection. Consequently, when the window drive reaches one of the two end positions described above, the stop impact is reduced and absorbed radially and tangentially. It is also possible, instead of having a separate damping element, to design the components themselves to dampen impact stresses. This is done, for example, by placing elastic spokes along the transmission path between the worm shaft and the driver plate output.

German Laid-Open Publication 44 32 955 discloses an electromotive drive for a motor vehicle window. Its control device is provided with an excess force limitation function, such that the raising/lowering movement is terminated when the window reaches one of the two end positions provided with a corresponding limit stop. In addition, the excess force limitation is cut off automatically before the window reaches the upper seal. This prevents the increased drive forces which occur when the window enters the seal from triggering the excess force limitation. For this purpose, the window height corresponding to this distance is stored by assigning a fixed reference position to the window when it is in its closed position, with its top edge bearing on the upper limit stop. A position or movement counter can then sense from this reference position when the defined distance is reached as the pane moves upward. The excess force limitation can consequently be cut off automatically.

OBJECTS OF THE INVENTION

It is a first object of the invention to provide sufficient protection against damage due to mechanical impact stresses by means of an electromotive actuator, in particular for a window or sliding roof in a motor vehicle. It is a further object to provide an electromotive actuator for a closing part, in particular for a window or sliding roof in a motor vehicle, which is simplified in construction. According to another object of the invention, the design and therefore the manufacture and assembly of a geared motor actuator is to be simplified.

SUMMARY OF THE INVENTION

These and other objects are achieved by the teachings recited in the independent claims. Particularly advantageous refinements of the invention are the subject matter of the dependent claims.

According to one formulation of the invention, an electromotive actuator is provided for moving a part, e.g., a window of a motor vehicle, through a range of available travel extending between a first end position and a second end position. The actuator includes an electric motor for moving the part selectively between the first end position and the second end position as well as a control device for electronically recording both the current position and current speed of the part. The control device is capable of interrupting power to the electric motor when the part reaches a coasting position, at which the part has substantially sufficient kinetic energy to move to the end position without further kinetic energy being imparted from the electric motor. The coasting position is calculated based on, e.g., the recorded current position and current speed of the part.

Fully utilizing the motor drive power for as rapid an opening or closing movement of the closing part as possible, the present invention makes it unnecessary to use separate intermediate damping parts or to design the intermediate transmission means to be elastic. In particular it is unnecessary to provide elastic spokes for the worm wheel or driver plate of the worm gear following the driving electric motor, for dampening impact stress. According to one preferred embodiment of the invention, the worm wheel and driver plate are combined into a solid, in particular injection-molded, component which is simple to produce. The component has the additional benefit of facilitating manufacture and assembly of the geared motor actuator.

The control device used in conjunction with the invention is, advantageously, generally similar to known devices, and is for example similar to that described in German Laid-Open Publication 44 32 955 mentioned above. All that is needed is a slight modification of the electric control of this device.

By once-only standardization, which only needs to be repeated after a power failure or the like, one of the two end positions is initialized by moving the window to that position. This end position is then stored. In a window drive or sliding roof drive, despite the fact that the invention requires no gear-side damping element, the end position selected is advantageously that into which the closing part can run with sufficient impact damping because of the seal present there. The other end position, in particular the closed position, is then established by the range of travel of the window or sliding roof, e.g., by means of an incremental sensor. The control device can then be set to switch off the electric motor driving the closing part shortly before the other end position is reached, such that the closing part is brought into its ultimate end position, without any impact stress, by means of simply its kinetic energy.

The position of the closing part, its range of travel and/or its instantaneous speed can be determined in a simple way by means of at least one sensor, for example a Hall sensor, assigned to the drive motor, by recording sensor pulse counts or pulse intervals.

BRIEF DESCRIPTION OF THE DRAWINGS

The invention and further advantageous refinements thereof according to the features of the dependent claims are explained in more detail below with the aid of diagrammatic, exemplary embodiments in the drawing, in which:

DETAILED DESCRIPTION OF THE PREFERRED EMBODIMENTS

Figure 1A:
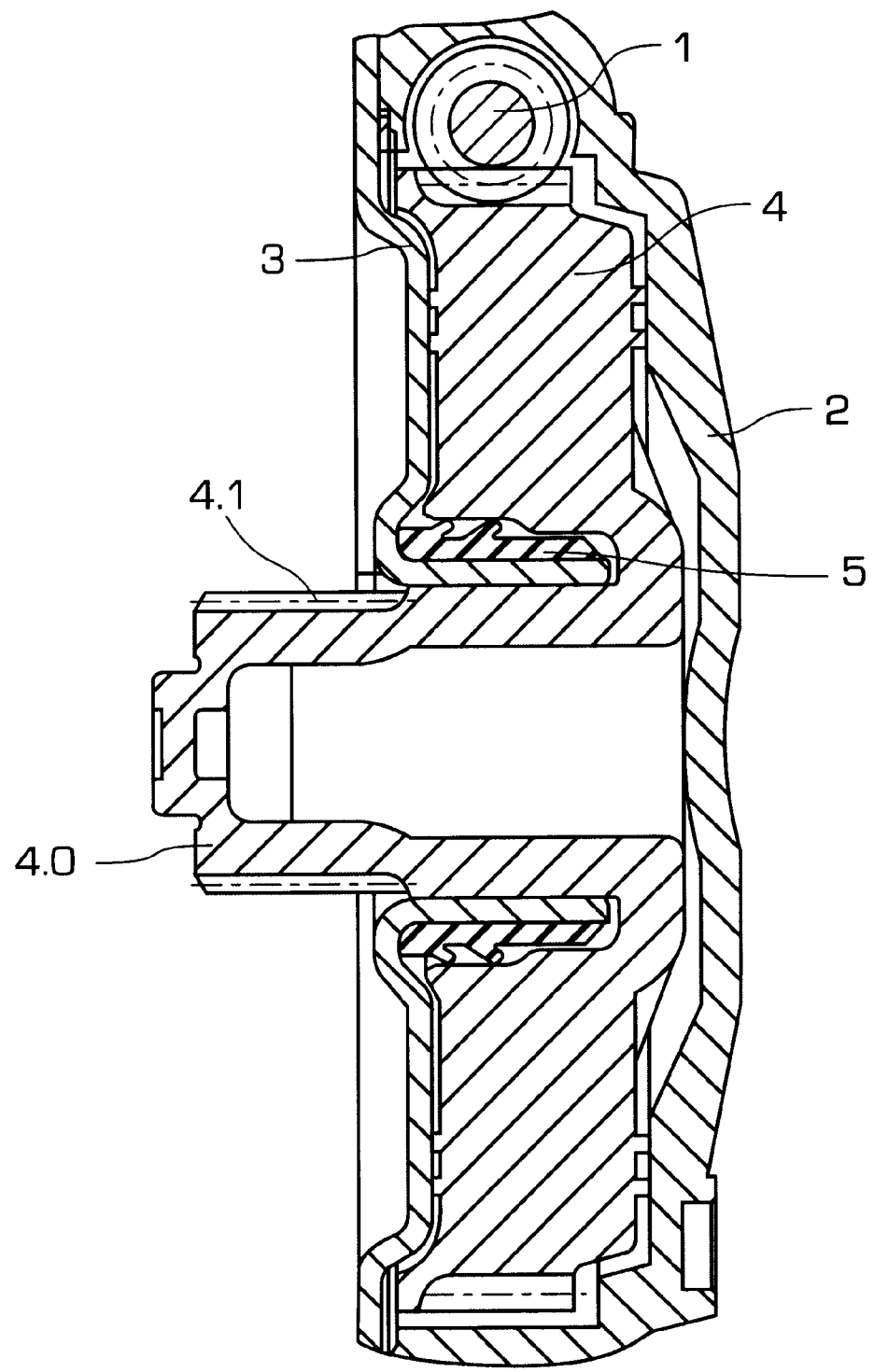
FIGS. 1A–1B show radial sections through the gear cases of two embodiments of a motor-operated automotive vehicle window drive.

FIG. 1A shows a radial section through a gear of a motor vehicle window drive, with a cup-shaped gear case 2. The gear case 2 is covered by a gear case cover 3 so as to provide a moistureproof seal. A commutator motor rotor shaft extending as a worm shaft 1 projects into the gear case 2,3, which is flanged to the commutator motor housing, and drives a worm wheel 4 which meshes with the worm shaft 1. The commutator motor can be of a type, e.g., as disclosed in German Utility Model 89 03 714. The worm wheel 4 is rotatably mounted on a bearing neck of the gear case cover 3 and is sealed off from the cover by a dynamic seal 5.

Figure 1B:
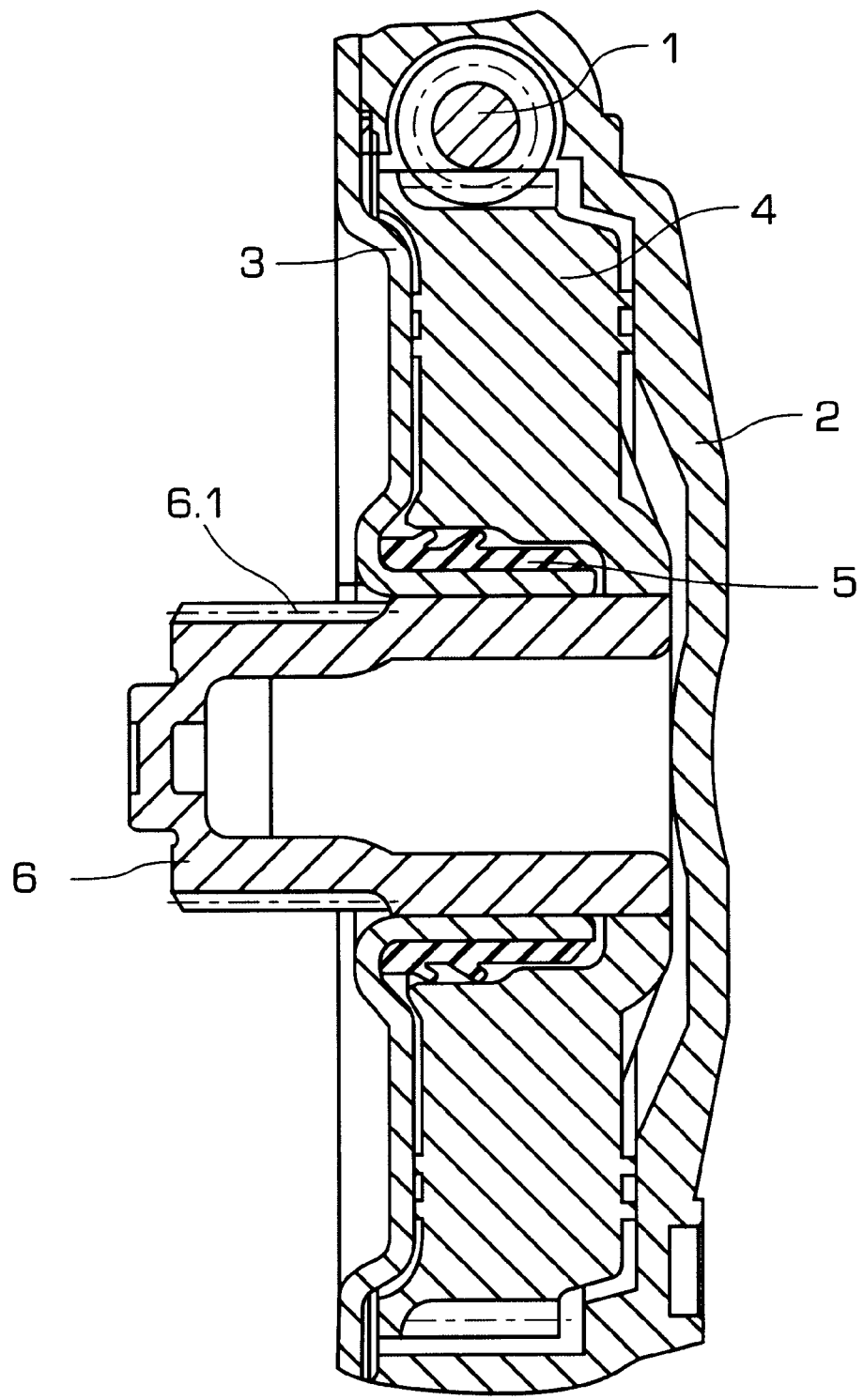
Figure 2:
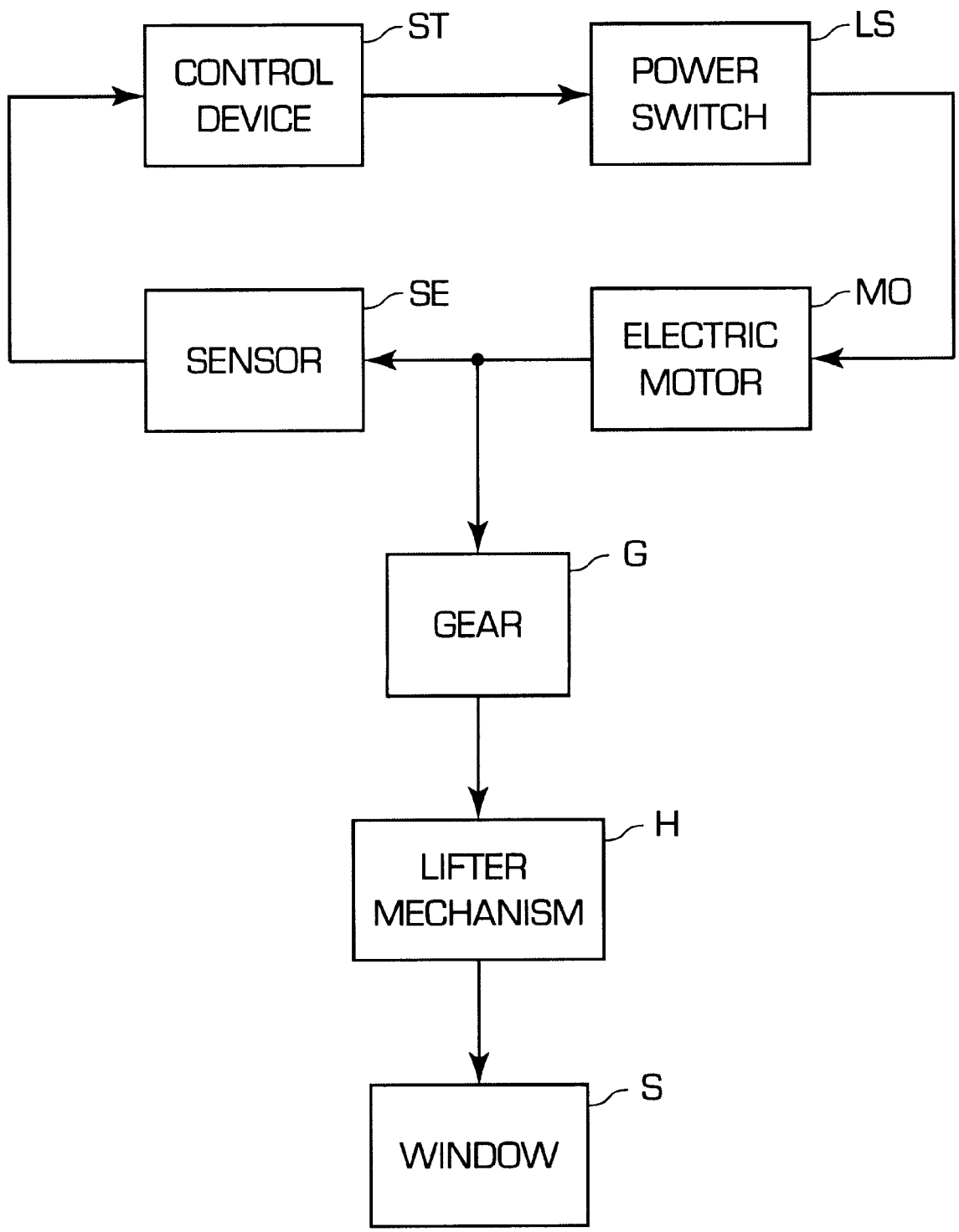
FIG. 2 shows a block diagram illustrating the components of an actuator for executing the raising/lowering movement and for recording the range of travel of the window.
Figure 3:
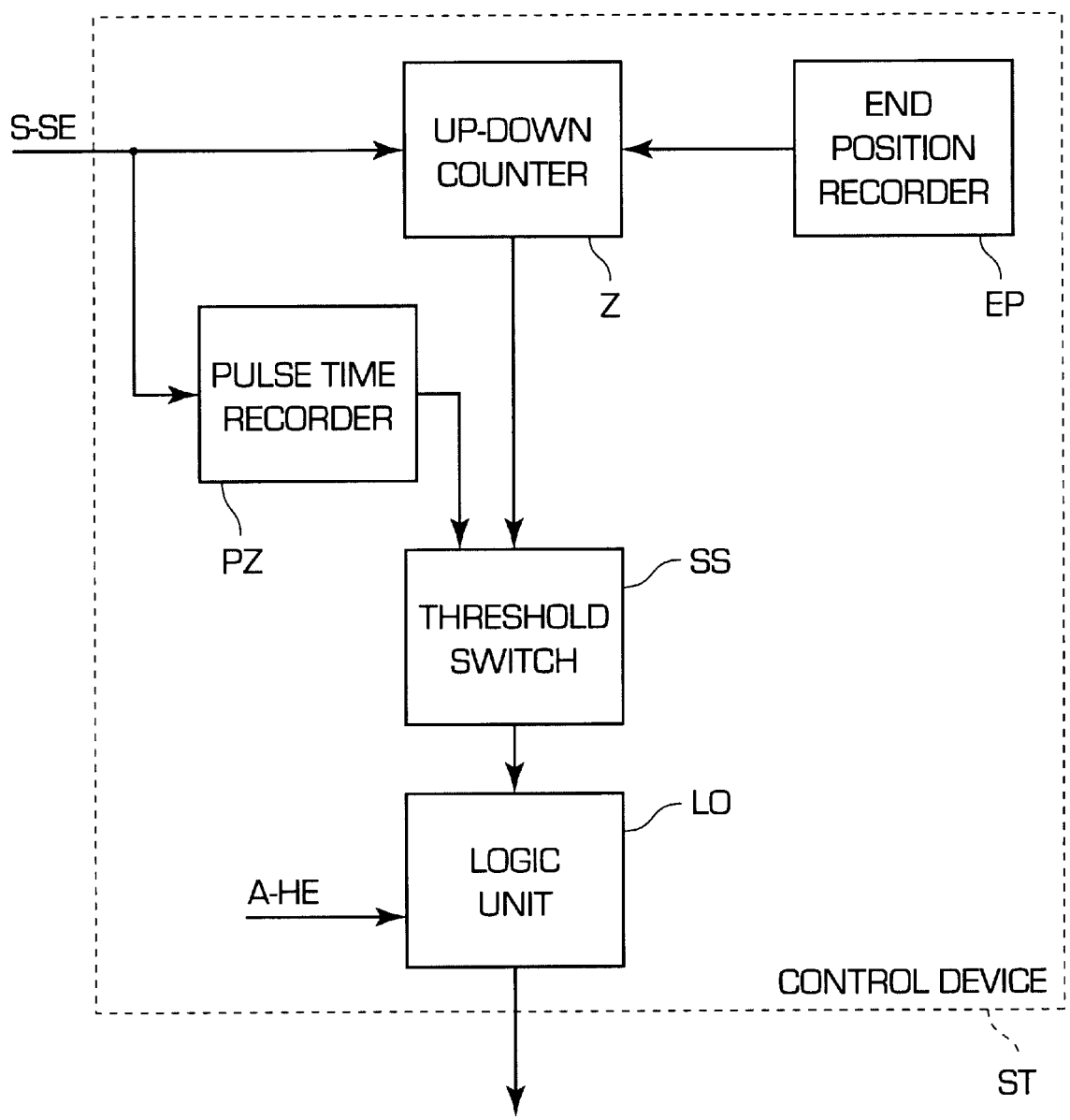
FIG. 3 shows a block diagram illustrating the components of a control device governing the raising/ lowering movement and the recording of the range of travel for the actuator according to FIG. 2.

Advantageously, the worm wheel 4, being a solid integral component, in particular a plastic injection molding, is designed to include an integrated output driver 4.0. Thus, the worm wheel 4 projects outward through a central orifice of the gear case cover 3 and has a drive pinion 4.1, to which a lifter mechanism H (see FIG. 2) can be coupled for raising or lowering a window S. Alternatively, the worm wheel and the output driver can be designed as separate components, such that the worm wheel 4 and the output driver 6, with pinion 6.1, mesh via a fitted plug-in connection, as shown by way of example in FIG. 1B.

An electric motor MO, preferably a commutator motor, which drives the lifter mechanism H via the gear G, is switched to righthand rotation, lefthand rotation or stop by a control device ST via a power switch LS. The power switch LS used may be, e.g., two changeover relays or one double relay or else a semiconductor switch, in particular in an H-bridge connection. The control device ST controlling the power switch LS and consequently the electric motor MO is dependent on an output signal S-SE from a sensor SE which supplies signals from the electric motor MO to the input of the control unit ST. These signals are proportional to the direction of rotation or to the rotational speed of the motor MO.

The sensor SE, known per se, is advantageously provided for recording both the direction of rotation and the rotational speed of the electric motor MO on the basis of signals which occur at specific, defined intervals. Two Hall probes, which are spaced at a circumferential angle of 90° and are preferably integrated into the brush system of the permanent magnet excitation electric motor MO are normally provided for this purpose. These Hall probes are assigned to a bipolar magnetic wheel on the rotor shaft of the electric motor MO.

This results in two phase shifted, preferably rectangular signals from the sensor. The phase differences of the signals determine the direction of rotation of the electric motor MO and consequently the direction of the raising/lowering movement of the window S. For example, righthand rotation of the motor MO corresponds to the window S being raised and lefthand rotation to the window S being lowered. The travel range of the window S can be determined by counting the flanks of the signals. The speed of the electric motor MO and, given the fixed gear ratio to the lifter mechanism H, also the speed of the window S being moved are inversely proportional to the time intervals of the signal flanks recorded by the sensor SE.

The signal S-SE coming from the sensor SE is supplied to two processing units, namely an up/down counter Z and a pulse time recorder PZ. The pulse time recorder PZ generates a speed-proportional signal from the time intervals of the flanks recorded by the sensor SE. This signal is fed to a threshold switch SS. The up/down counter Z evaluates the information of the signal S-SE from the sensor SE by means of a signal from an end position recorder EP, which produces a signal that is proportional to the absolute position and therefore to the current range of travel. This signal is fed to the threshold switch SS as well. More specifically, the end position recorder EP provides a signal which enables an absolute position to be generated from the relative position. The relative position is generated by counting the flanks of the signals from the sensor SE according to direction.

When the window S first reaches an end position, the end position recorder sets the up/down counter Z to an initial value, i.e. initializes it. If the upper position corresponds to the number 0, the lower position then gives a value which is proportional to the length of the window S. Initialization by the end position recorder EP need be repeated only when the system cannot recognize its absolute position from the stored data. This may occur, for example, after a voltage drop caused by disconnection of the vehicle battery.

The output signal from the threshold switch SS activates the power switch LS via a decision logic unit LO. The latter is designed so that the signal coming from the threshold switch SS takes effect only when there is an adjustment command A-HE for "raise" or "close", i.e., only in the direction of raising/closing. The threshold switch SS is dependent on the speed-proportional output signal from the pulse time recorder PZ in such a way that the kinetic energy of the window S becomes zero when or shortly before the end position of the pane S is reached.

Alternatively, to simplify matters, this decision logic unit LO may be dispensed with in connection with a "lower" or "open" adjustment command, generally for the following reasons:

When the lower end position "open" is reached, it is relatively unimportant whether the window S runs into the lower seal a few millimeters more or less. The only important factor is that the electric motor MO is switched off early enough to ensure that the window S never moves up against the lower limit stop with undue impact stress. There is therefore no need for a switch-off time which is calculated individually in each case according to speed. This time is only fixed during initialization over the entire travel of the window S.

By contrast, it is necessary for the window to move to the upper end position "close" exactly, so as to ensure equally good sealing in a consistent, reliable manner. For this purpose, the device uses a speed-dependent switch-off which can be calculated individually in each case. It is then possible for the window S to move as smoothly as possible until shortly before it reaches the upper end position, that is the closing position. Ideally, after the electric motor MO has been switched off, the window S comes to a stop at the closing and sealing upper end position, without any undue impact stress, due to the dynamic energy previously imparted to it.

Due to tolerances in the system as a whole, the window S will not, or at least not always, come to a stop exactly at the upper end position, even when the system is adjusted as accurately as possible. Since the position of the window S is measured, e.g., by the method of incremental sensors and initialization described above, if the end position is not yet reached completely, the distance between the upper end position and the point at which the window S came to a stop is known. This short distance can be overcome by switching the electric motor MO on once again, so that the window S then runs into the end position with very little kinetic energy. While this is happening, the moving parts of the system cannot reach appreciable speed over the short distance and therefore also do not absorb any appreciable kinetic energy that would result in impact stresses.

The subject of the invention has been explained with reference to a window drive for a motor vehicle. However, the scope of the present invention also embraces use of the invention in similar drives for other types of closing parts capable of being driven between an opening position and a closing position by an actuator. One example is a drive for a sliding roof of a motor vehicle.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. An electromotive actuator for moving a part through a range of available travel extending between a first end position and a second end position, comprising:
    an electric motor for moving the part selectively between the first end position and the second end position;
    a gear interposed between said electric motor and the moving part; and
    an output driver interposed between said gear and the moving part;
    means for electronically recording an actual current position of the part;
    means for electronically recording an actual current speed of the part; and
    means for switching off an energy supply to the electric motor as a function of the recorded speed of the part at a point along the available travel at which a remaining available travel corresponds to an absorption of kinetic energy sufficient to move the part substantially to the first end position without imparting substantial impact stress to the part;
    wherein said gear and said output driver are joined without an elastic damping element incorporated into or interposed between said gear and said output driver.

2. The electromotive actuator as claimed in claim 1, wherein the moving part is a window of a motor vehicle and the first end position is a window-closed position.

3. The electromotive actuator as claimed in claim 1, wherein the moving part is a sliding roof of a motor vehicle and the first end position is a roof-closed position.

4. The electromotive actuator as claimed in claim 1, further comprising:
    means for again switching on the energy supply shortly before the part reaches the first end position, to provide a motor-assisted movement of the part into the first end position.

5. The electromotive actuator as claimed in claim 4, wherein the part is in a closed position in the first end position.

6. The electromotive actuator as claimed in claim 1, further comprising:
    a sensor for outputting signals indicative of the current position and the current speed and direction of travel of the part; and
    a control device coupled to said sensor for receiving the signals, said control device comprising said means for recording the current position and said means for recording the current speed.

7. The electromotive actuator as claimed in claim 6, wherein said sensor is a sensor of said electric motor.

8. The electromotive actuator as claimed in claim 1, wherein said gear and said output driver are directly interconnected by means of a fitted plug-in connection.

9. The electromotive actuator as claimed in claim 8, wherein:
    said electric motor comprises a worm shaft; and
    said gear comprises a worm gear which meshes with said worm shaft.

10. The electromotive actuator as claimed in claim 1, wherein said gear and said output driver are formed as a one-piece, integral component.

11. The electromotive actuator as claimed in claim 10, wherein said gear and said output driver are a solid, plastic, injection-molded part.

12. The electromotive actuator as claimed in claim 10, wherein:
    said electric motor comprises a worm shaft; and
    said gear and said output driver are formed as a one-piece, integral component including a worm gear portion, which meshes with said worm shaft, and an output driver portion.

13. An electromotive actuator for moving a part through a range of available travel terminating in a stop defining an end position, comprising:
    an electric motor coupled to the part and imparting kinetic energy to the part for moving the part towards the end position;
    a gear interposed between said electric motor and the part; and
    an output driver interposed between said gear and the part;
    a sensor arranged to output signals indicative of at least a current position and a current speed of the part; and an electronic control device coupled to said sensor and said electric motor and configured to control said electric motor in accordance with the output signals;

wherein neither said gear nor said output driver have an elastic damping element incorporated into or interposed between said gear and said output driver, and wherein said electronic control device comprises circuitry that interrupts power to said electric motor when the part reaches a coasting position, prior to the end position, at which the part has substantially sufficient kinetic energy to move to the end position without further kinetic energy imparted from said electric motor but at which the part has substantially insufficient kinetic energy to receive impact stress from the stop.

14. An electromotive actuator according to claim 13, wherein said electronic control device comprises circuitry that resumes power to said electric motor when the part reaches a further position between the coasting position and the end position.

15. An electromotive actuator according to claim 13, wherein said electronic control device comprises a switch for interrupting the power to said electric motor when the part reaches the coasting position.

16. An electromotive actuator according to claim 13, wherein:

the range of available travel for the moving part further terminates in a further end position; and said sensor is further arranged to output signals indicative of a current moving direction of the part.

17. The electromotive actuator as claimed in claim 13, wherein said gear and said output driver are directly interconnected by means of a fitted plug-in connection.

18. The electromotive actuator as claimed in claim 13, wherein said gear and said output driver are formed as a one-piece, integral component.

* * * * *